United States Patent
Bai

(10) Patent No.: US 9,172,420 B2
(45) Date of Patent: Oct. 27, 2015

(54) MOBILE COMMUNICATION TERMINAL

(75) Inventor: Jian Bai, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 21 days.

(21) Appl. No.: 14/123,218

(22) PCT Filed: May 16, 2012

(86) PCT No.: PCT/CN2012/075587
§ 371 (c)(1),
(2), (4) Date: Nov. 30, 2013

(87) PCT Pub. No.: WO2013/063915
PCT Pub. Date: May 10, 2013

(65) Prior Publication Data
US 2014/0087670 A1     Mar. 27, 2014

(30) Foreign Application Priority Data

Nov. 4, 2011     (CN) .......................... 2011 1 0346486

(51) Int. Cl.
*H04B 1/38* (2015.01)
*H04B 1/40* (2015.01)
*H04B 1/00* (2006.01)

(52) U.S. Cl.
CPC .................. *H04B 1/40* (2013.01); *H04B 1/006* (2013.01); *Y02B 60/50* (2013.01)

(58) Field of Classification Search
CPC ....................................................... H04B 1/525
USPC ................... 455/63.1, 73, 501, 571
See application file for complete search history.

(56) References Cited

U.S. PATENT DOCUMENTS 6,751,470 B1 * 6/2004 Ella et al. ................... 455/552.1
8,781,522 B2 * 7/2014 Tran et al. .................. 455/552.1

FOREIGN PATENT DOCUMENTS

| CN | 1476680 A | 2/2004 |
|---|---|---|
| CN | 1647401 A | 7/2005 |
| CN | 102404879 A | 4/2012 |

* cited by examiner

*Primary Examiner* — Tuan H Nguyen
(74) *Attorney, Agent, or Firm* — Cheng-Ju Chiang

(57) ABSTRACT

The present disclosure discloses a mobile communication terminal comprising: a first antenna, being configured to receive a radio frequency (RF) signal from the outside; a wireless transceiver, being configured to obtain the RF signal and amplifies a down-converted signal in the RF signal into a baseband signal; a baseband processor, being configured to obtain the baseband signal from the wireless transceiver and demodulate the baseband signal to generate a to-be-transmitted signal; the wireless transceiver is further configured to convert the to-be-transmitted signal into an RF signal and output the RF signal from the signal transmitting port; and a second antenna, being configured to obtain the to-be-transmitted RF signal and transmit the to-be-transmitted RF signal. With the above technical solution, the present disclosure solves the problem of insertion loss caused by using a duplexer, thereby lowering the noise level in the transmitting path within the receiving frequency band.

9 Claims, 2 Drawing Sheets

MOBILE COMMUNICATION TERMINAL

CROSS REFERENCE TO RELATED APPLICATIONS

The present application is a 35 U.S.C. §371 National Phase conversion of International (PCT) Patent Application No. PCT/CN2012/075587, filed on May 16, 2012, the disclosure of which is incorporated by reference herein. The PCT International Patent Application was filed and published in Chinese.

FIELD OF THE INVENTION

The present disclosure generally relates to the technical field of communications, and more particularly, to a mobile communication terminal.

BACKGROUND OF THE INVENTION

The existing 3G ($3^{rd}$-generation mobile communication technology)/4G ($4^{th}$-generation mobile communication technology) FDD (Frequency Division Duplexing) mobile terminals adopt a full duplex design, so the transmitting path and the receiving path thereof operate simultaneously. In the conventional FDD radio frequency (RF) architecture, the duplexer is an essential device, which mainly functions to:

1) combine the transmitting path and the receiving path together; and 2) perform filtering on the transmitting path and the receiving path.

The conventional duplexes have a relatively large insertion loss (IL); and especially in the case that the frequency is high and the transmitting frequency band is close to the receiving frequency band, the insertion loss is very large. For example, the duplexer used in WCDMA BC2 (Wideband Code Division Multiple Access BC2) has an insertion loss of above 2.5 dB because the transmitting frequency band is 1850 MHz-1910 MHz and the receiving frequency band is 1930 MHz-1990 MHz. This requires use of a band-pass filter (BPF) having a central frequency of 1950 MHz and a transition frequency band of only 20 MHz, which is very difficult to be implemented.

Such a great insertion loss leads to the following problems:

1) the problem of large power consumption. Because of the large insertion loss, the output power of the amplifier must be increased to ensure an adequate output power, and this will necessarily increase the power consumption.

2) the problem of heat dissipation. The increased output power and the increased power consumption will necessarily lead to generation of more heat. Heat generation of power amplifiers of the conventional WCDMA terminals is considerable, which has an influence on the battery and the user experience.

3) The problem of cost. Devices of high technical specifications necessarily have high cost.

Referring to FIG. 1, an RF framework of a typical WCDMA+GSM dual-mode terminal is shown therein. The WCDMA+GSM dual-mode terminal mainly comprises an antenna 95, a duplexer 90, a wireless transceiver 10, a plurality of signal receiving branches and a plurality of signal transmitting branches.

As two signal receiving branches, a GSM980/850 RX SAW module 20 and a DCS/PCS RX SAW module 30 are configured to receive an RF signal obtained by the antenna 95 and gated by the duplexer 90. The wireless transceiver 10 obtains the RF signal, which has been processed by the GSM980/850 RX SAW module 20, via a port 1011 and a port 1012, and obtains the RF signal, which has been processed by the DCS/PCS RX SAW module 30, via a port 1013 and a port 1014.

A GSM HB PA (GSM High Band Power Amplifier) 40 and an HB MN (High Band Match Network) 41 constitute a GSM signal transmitting branch. The wireless transceiver 10 transmits a GSM high band (HB) signal via a port 1015 to the GSM HB PA 40 and the HB MN 41. The GSM HB PA 40 and the HB MN 41 perform power amplifying and network matching respectively on the GSM HB signal. The GSM HB signal which has been processed is transmitted by the antenna 95 after being gated by the duplexer 90.

A GSM LB PA (GSM Low Band Power Amplifier) 50 and an LB MN (Low Band Match Network) 51 constitute another GSM signal transmitting branch. The wireless transceiver 10 transmits a GSM low band (LB) signal via a port 1016 to the GSM LB PA 50 and the LB MN 51. The GSM LB PA 50 and the LB MN 51 perform power amplifying and network matching respectively on the GSM LB signal. The GSM LB signal which has been processed is transmitted by the antenna 95 after being gated by the duplexer 90.

A WCDMA BC1 PA (WCDMA BC1 Power Amplifier) 60, a W MN1 (WCDMA Match Network) 61, a duplexer 62 and a DPX MN (Duplexer Match Network) 63 constitute a WCDMA signal transmitting/receiving branch, which is configured to transmit or receive a WCDMA BC1 signal. The wireless transceiver 10 transmits a BC1 signal via a port 1019. The WCDMA BC1 PA 60, the W MN1 61 and the DPX MN 63 perform power amplifying and network matching respectively on the BC1 signal. The BC1 signal which has been processed is transmitted by the antenna 95 after being gated by the duplexer 90. The duplexer 62 can be used to select a path that allows the BC1 signal transmitted by the wireless transceiver 10 via the port 1019 to be transmitted via the antenna 95 or allows the wireless transceiver 10 to obtain a corresponding WCDMA signal from the antenna 95 via a port 1017.

Likewise, the wireless transceiver 10 generates a WCDMA BC2 signal and a WCDMA BC5 signal respectively via ports 1022 and 1023 and, via ports 1017 and 1018, obtains a BC2 signal and a BC5 signal received by the antenna 95 from the outside respectively. Thus, the ports 1022 and 1023 respectively correspond to two WCDMA signal transmitting branches, and the ports 1017 and 1018 respectively correspond to two WCDMA signal receiving branches. The architecture of the aforesaid WCDMA signal transmitting/receiving branch is completely the same as that of the aforesaid WCDMA signal transmitting/receiving branch corresponding to the BC1 signal, and thus will not be further described herein.

Additionally, an RF connector 92 and an ANT MN (Antenna Match Network) 94 are further provided between the antenna and the duplexer 90. The RF connector 92 and the ANT MN 94 are respectively configured to couple a plurality of signals from different signal sources into one signal and perform antenna matching on the signal.

In conventional mobile communication terminals, the duplexer 90 mainly functions to:

1) combine the transmitting path and the receiving path together; and 2) providing an isolation between the transmitting path and the receiving path, that is, attenuating the noise caused by the RF signal in the transmitting path within the receiving frequency band, thereby protecting receiving signals from the interference caused by the RF signal.

The reason for the need of providing an isolation between the transmitting path and the receiving path is that, the receiving path requires a high sensitivity (which is typically −110 dBm in conventional technologies), while the transmitting path is a high-power path, the intensity of which can be up to 28 dBm. Because of the non-linearity of the RF system, there necessarily exists very intensive out-of-band (OOB) strays in the case that the main wave is 28 dBm. Such strays will be directly fed to the receiving end if they are not isolated at the receiving frequency band, and the intensity thereof will be higher than that of the useful receiving signals. Finally, the receiving performance is influenced.

The receiving system design for WCDMA signals of the mobile communication terminal shown in FIG. 1 is analyzed as follows:

The typical receiving sensitivity of a conventional WCDAMA terminal is −110 dBm.

The power of the DPDCH (Dedicated Physical Data Channel) is −120.3 dBm.

The channel code rate for WCDMA sensitivity test is 12.2 kbps, and the code gain is 10×log (3.84 MHZ/12.2)=25 dB.

The decoding threshold for QPSK modulation of the WCDAMA is 5.2 dB, and a margin of 2 dB needs to be reserved, so an input signal to noise ratio (SNR) of 7.2 dB is required for the demodulation module.

Therefore, the noise at the input end of the demodulation module should be below:

$$-120.3+25-7.2=-102.5 \text{ dBm}/3.84 \text{ MHz}=-168.343 \text{ dBm/Hz}.$$

Taking a typical noise figure of 5 dB of the wireless transceiver 10 into consideration, the noise at the input end of the demodulation module is required to be below −173.343 dBm/Hz.

The system thermal noise is:

$$KBT=-200+26.022=-173.977 \text{ dBm/Hz}=-108.13 \text{ dBm}/3.84 \text{ MHz}$$

where K (Boltzmann constant)=$1.38 \times 10^{-20}$ mJ/K, B=3.84 MHz (65.843 dB), T=290 K.

The typical output noise of the power amplifiers (60, 70 and 80) is:

$$-160 \text{ dBm/Hz (the output of the wireless transceiver)}+ 28 \text{ dB (the typical amplifier gain of the amplifier at the receiving frequency band)}=-132 \text{ dBm}/\text{Hz}=-66.16 \text{ dBm}/3.84 \text{ MHz}.$$

Therefore, the duplexer 90 is required to provide an isolation of at least 173.343−132=41 dB.

With such a great isolation, the insertion loss of the conventional duplexers is relatively large.

Accordingly, an urgent need exists in the art to provide an antenna modulation method for a mobile communication terminal capable of solving the aforesaid problems.

SUMMARY OF THE INVENTION

To solve the aforesaid technical problems, the present disclosure provides a mobile communication terminal to solve the problem of a relatively large insertion loss in the conventional duplexers.

One technical solution of the present disclosure is to provide a mobile communication terminal, which comprises: a first antenna, being configured to receive a radio frequency (RF) signal from the outside; a receiving acoustic surface wave filter, being configured to perform receiving acoustic surface wave filtering on the RF signal received by the first antenna; a wireless transceiver comprising a signal receiving port and a signal transmitting port, being configured to obtain the RF signal, on which the receiving acoustic surface wave filtering has been performed, from the receiving acoustic surface wave filter via the signal receiving port and amplifies a down-converted signal in the RF signal into a baseband signal; a baseband processor, being configured to obtain the baseband signal from the wireless transceiver and demodulate the baseband signal to generate a to-be-transmitted signal for transmission to the wireless transceiver; the wireless transceiver is further configured to convert the to-be-transmitted signal into an RF signal and output the RF signal from the signal transmitting port; a power amplifier having an input end connected to the signal transmitting port, being configured to obtain the RF signal from the signal transmitting port, amplify the power of the to-be-transmitted RF signal, and output the to-be-transmitted RF signal of which the power has been amplified from an output end of the power amplifier; and a second antenna connected with the output end, being configured to obtain the to-be-transmitted RF signal from the output end and transmit the to-be-transmitted RF signal. The RF signal comprises a WCDMA BC1 signal, a WCDMA BC2 signal, a WCDMA BC5 signal and a WCDMA BC8 signal. The signal receiving port comprises a first signal receiving port, a second signal receiving port, a third signal receiving port and a fourth signal receiving port. The mobile communication terminal further comprises a first single-pole multi-throw (SPMT) switch disposed between the first antenna and the wireless transceiver to selectively connect one of the first signal receiving port, the second signal receiving port, the third signal receiving port and the fourth signal receiving port with the first antenna. The to-be-transmitted RF signal comprises a to-be-transmitted WCDMA BC1 signal, a to-be-transmitted WCDMA BC2 signal or a to-be-transmitted WCDMA BC5 signal. The signal transmitting port comprises a first signal transmitting port, a second signal transmitting port and a third signal transmitting port. The mobile communication terminal further comprises a second SPMT switch disposed between the second antenna and the wireless transceiver to selectively connect one of the first signal transmitting port, the second signal transmitting port and the third signal transmitting port with the second antenna.

Another technical solution of the present disclosure is to provide a mobile communication terminal, which comprises: a first antenna, being configured to receive a radio frequency (RF) signal from the outside; a wireless transceiver comprising a signal receiving port and a signal transmitting port, being configured to obtain the RF signal from the first antenna via the signal receiving port and amplifies a down-converted signal in the RF signal into a baseband signal; a baseband processor, being configured to obtain the baseband signal from the wireless transceiver and demodulate the baseband signal to generate a to-be-transmitted signal for transmission to the wireless transceiver; the wireless transceiver is further configured to convert the to-be-transmitted signal into an RF signal and output the RF signal from the signal transmitting port; and a second antenna, being configured to obtain the to-be-transmitted RF signal from the signal transmitting port and transmit the to-be-transmitted RF signal.

The mobile communication terminal further comprises a power amplifier disposed between the wireless transceiver and the second antenna. The power amplifier has an input end connected to the signal transmitting port and an output end connected to the second antenna. The power amplifier is configured to amplify the power of the to-be-transmitted RF signal output from the signal transmitting port, and output the to-be-transmitted RF signal of which the power has been amplified to the second antenna.

The mobile communication terminal further comprises a low-pass filter (LPF) disposed between the power amplifier and the second antenna. The LPF is configured to perform low-pass filtering on the to-be-transmitted RF signal output from the output end of the power amplifier.

The mobile communication terminal further comprises a receiving acoustic surface wave filter disposed between the first antenna and the wireless transceiver. The receiving acoustic surface wave filter is configured to perform receiving acoustic surface wave filtering on the RF signal received by the first antenna and output the RF signal, on which the receiving acoustic surface wave filtering has been performed, to the signal receiving port.

The RF signal comprises a WCDMA BC1 signal, a WCDMA BC2 signal, a WCDMA BC5 signal and a WCDMA BC8 signal. The signal receiving port comprises a first signal receiving port, a second signal receiving port, a third signal receiving port and a fourth signal receiving port. The mobile communication terminal further comprises a first SPMT switch disposed between the first antenna and the wireless transceiver to selectively connect one of the first signal receiving port, the second signal receiving port, the third signal receiving port and the fourth signal receiving port with the first antenna.

The to-be-transmitted RF signal comprises a to-be-transmitted WCDMA BC1 signal, a to-be-transmitted WCDMA BC2 signal or a to-be-transmitted WCDMA BC5 signal. The signal transmitting port comprises a first signal transmitting port, a second signal transmitting port and a third signal transmitting port. The mobile communication terminal further comprises a second SPMT switch disposed between the second antenna and the wireless transceiver to selectively connect one of the first signal transmitting port, the second signal transmitting port and the third signal transmitting port with the second antenna.

The RF signal further comprises a GSM 900 signal, a GSM 850 signal and a GSM DCS signal. The signal receiving port comprises a fifth signal receiving port, a sixth signal receiving port and a seventh signal receiving port. The first SPMT switch further selectively connects one of the fifth signal receiving port, the sixth signal receiving port and the seventh signal receiving port with the first antenna.

The to-be-transmitted RF signal further comprises a GSM HB signal and a GSM LB signal. The signal transmitting port further comprises a fourth signal transmitting port and a fifth signal transmitting port. The second SPMT switch further selectively connects one of the fourth signal transmitting port and the fifth signal transmitting port with the second antenna.

The mobile communication terminal further comprises a broadband power coupler disposed between the first antenna and the second SPMT switch to detect a transmitting power of the to-be-transmitted RF signal.

The low-pass filter, the second SPMT switch and the broadband power coupler are integrated into one chip.

The present disclosure provides the following benefits: as compared to the prior art, the technical solutions of the present disclosure eliminate the need of a duplexer by providing a first antenna for receiving an RF signal from the outside and a second antenna for transmitting a to-be-transmitted RF signal. Therefore, the problem of insertion loss caused by using the duplexer is solved, thereby lowering the noise level in the transmitting path within the receiving frequency band. Additionally, the power consumption and heat generation of the system can be lowered and, meanwhile, the RF architecture can be simplified to lower the cost and achieve a more compact space. The present disclosure is especially adapted for platforms with relatively low output power.

DETAILED DESCRIPTION OF THE INVENTION

Figure 1:
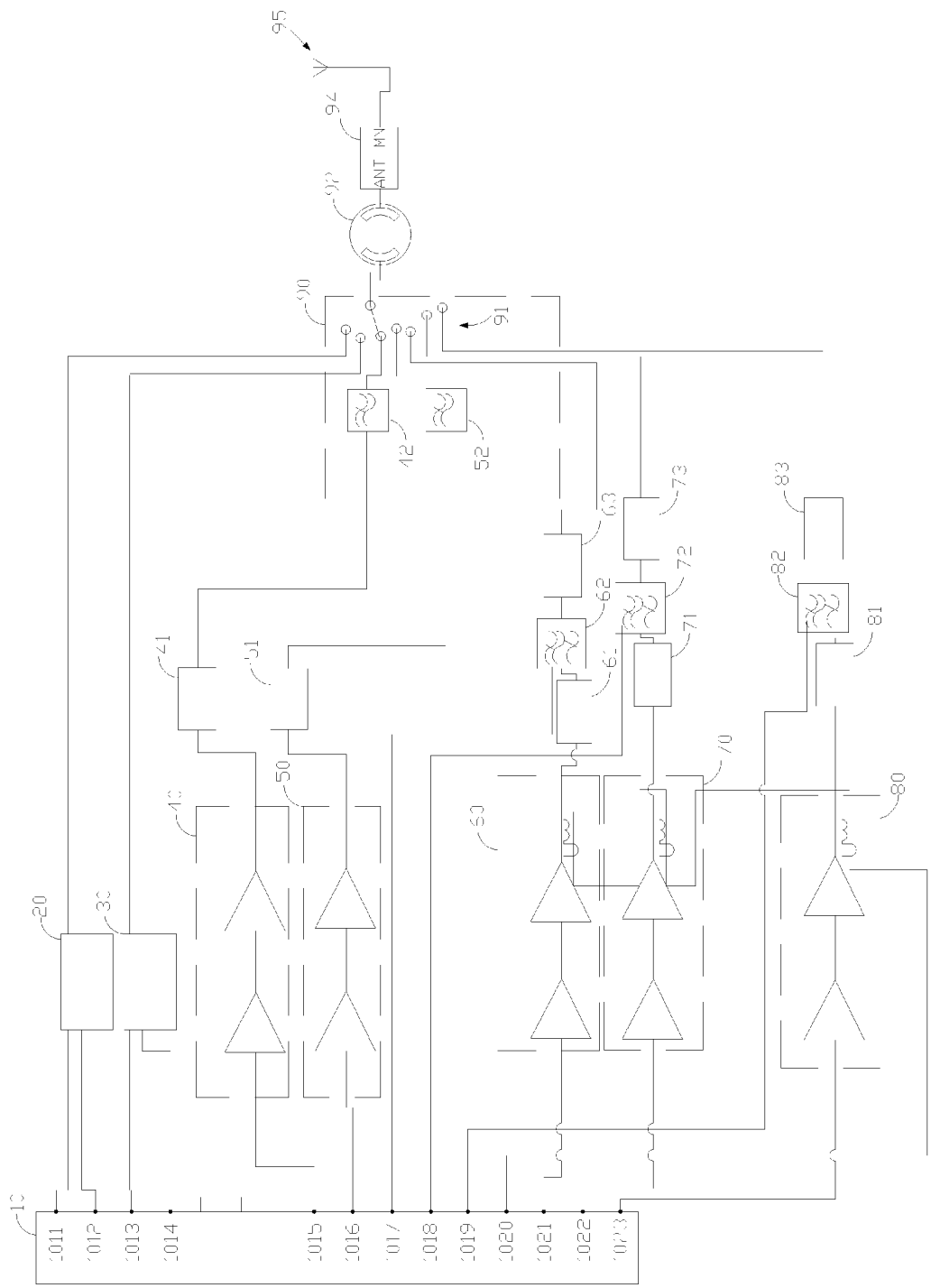
FIG. 1 is a schematic view illustrating a circuit structure of a conventional mobile communication terminal.
Figure 2:
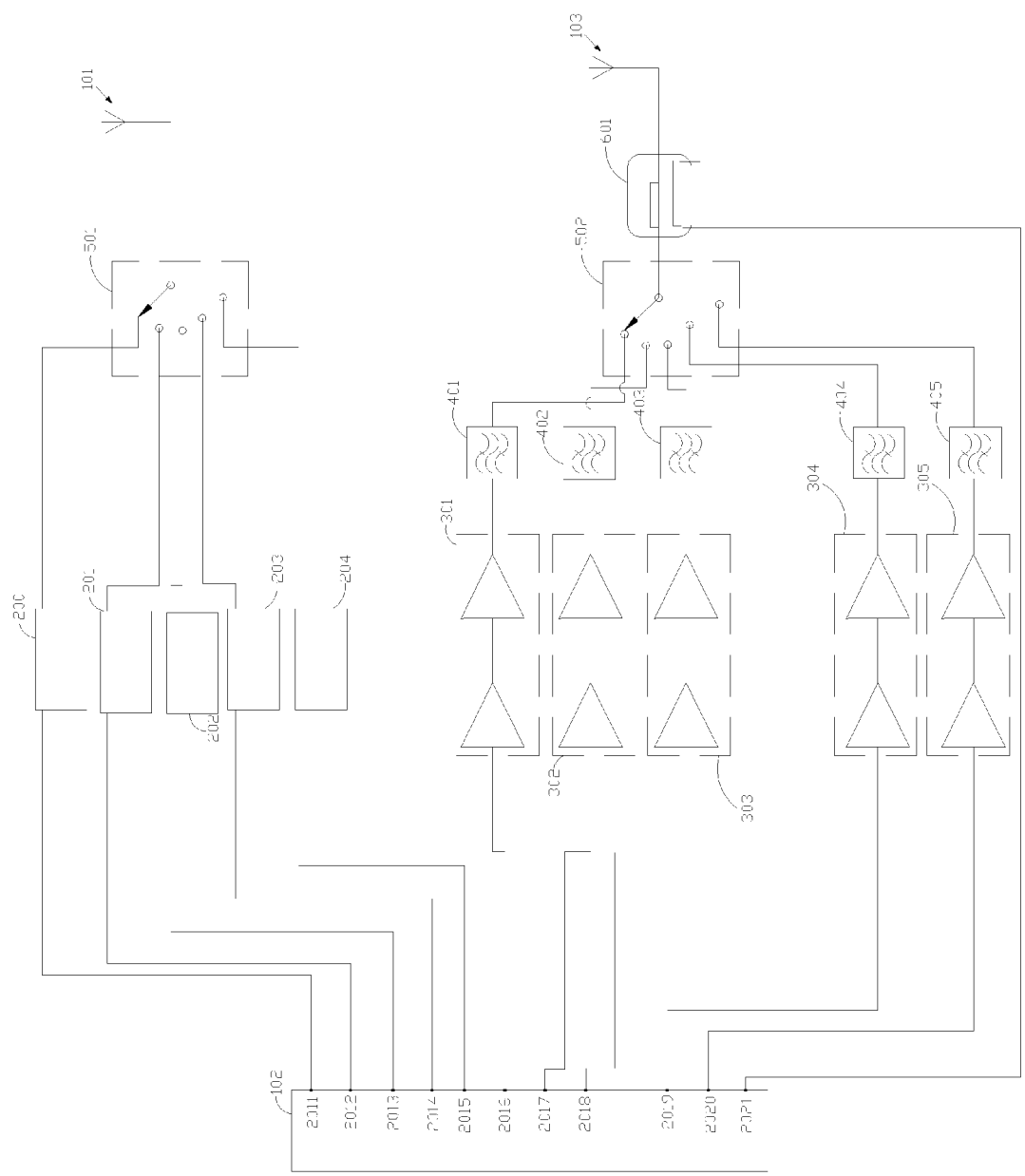
FIG. 2 is a schematic view illustrating a circuit structure of a mobile communication terminal according to a preferred embodiment of the present disclosure.

Referring to FIG. 2, FIG. 2 is a schematic view illustrating a circuit structure of a mobile communication terminal according to a preferred embodiment of the present disclosure. As shown in FIG. 2, the mobile communication terminal of the present disclosure comprises: a first antenna 101, being configured to receive an RF signal from the outside; a wireless transceiver 102 comprising a signal receiving port and a signal transmitting port, being configured to obtain the RF signal from the first antenna 101 via the signal receiving port and amplifies a down-converted signal in the RF signal into a baseband signal; a baseband processor (not shown), being configured to obtain the baseband signal from the wireless transceiver 102 and demodulate the baseband signal to generate a to-be-transmitted signal for transmission to the wireless transceiver 102; the wireless transceiver 102 is further configured to convert the to-be-transmitted signal into an RF signal and output the RF signal from the signal transmitting port; and a second antenna 103, being configured to obtain the to-be-transmitted RF signal from the signal transmitting port and transmit the to-be-transmitted RF signal.

As compared to the prior art, the improvements of the present disclosure mainly lie in the first antenna 101, the second antenna 103 and the wireless transceiver 102, but not in the operating process and the connections between the baseband processor and the wireless transceiver 102. Therefore, the baseband processor is not shown in FIG. 2.

Power amplifiers 301, 302, 303, 304 and 305 are provided between the wireless transceiver 102 and the second antenna 103. Each of the power amplifiers 301, 302, 303, 304 and 305 has an input end connected to the signal transmitting port and an output end connected to the second antenna 103. Each of the power amplifiers 301, 302, 303, 304 and 305 is configured to amplify the power of the to-be-transmitted RF signal output from the signal transmitting port and output the to-be-transmitted RF signal of which the power has been amplified to the second antenna 103.

Low-pass filters (LPFs) 401, 402, 403, 404 and 405 are disposed between the power amplifiers 301, 302, 303, 304 and 305 and the second antenna 103 respectively. The LPFs 401, 402, 403, 404 and 405 are configured to perform low-pass filtering on the to-be-transmitted RF signal output from the output end of the power amplifiers 301, 302, 303, 304 and 305 respectively.

Receiving acoustic surface wave filters 200, 201, 202, 203 and 204 are disposed between the first antenna 101 and the wireless transceiver 102. Each of the receiving acoustic surface wave filters 200, 201, 202, 203 and 204 is configured to perform receiving acoustic surface wave filtering on the RF signal received by the first antenna 101 and output the RF signal, on which the receiving acoustic surface wave filtering has been performed, to the signal receiving port.

When the mobile communication terminal supports the WCDMA standard, the RF signal comprises a WCDMA BC8 signal, a WCDMA BC5 signal, a WCDMA BC2 signal and a WCDMA BC4 signal. The signal receiving port comprises a first signal receiving port 2011, a second signal receiving port 2012, a third signal receiving port 2014 and a fourth signal receiving port 2015. The mobile communication terminal further comprises a first SPMT switch 501 disposed between the first antenna 101 and the wireless transceiver 102 to selectively connect one of the first signal receiving port 2011, the second signal receiving port 2012, the third signal receiving port 2014 and the fourth signal receiving port 2015 with the first antenna 101.

The to-be-transmitted RF signal comprises a to-be-transmitted WCDMA BC1 signal, a to-be-transmitted WCDMA BC2 signal or a to-be-transmitted WCDMA BC5 signal. The signal transmitting port comprises a first signal transmitting port 2016, a second signal transmitting port 2017 and a third signal transmitting port 2018. The mobile communication terminal further comprises a second SPMT switch 502 disposed between the second antenna 103 and the wireless transceiver 102 to selectively connect one of the first signal transmitting port, the second signal transmitting port and the third signal transmitting port with the second antenna 103.

When the mobile communication terminal supports both the WCDMA standard and the GSM standard, the RF signal further comprises a GSM 900 signal, a GSM 850 signal and a GSM DCS signal. The signal receiving port comprises a fifth signal receiving port 2011, a sixth signal receiving port 2012 and a seventh signal receiving port 2013. The fifth signal receiving port 2011 and the sixth signal receiving port 2012 can be multiplexed as the first signal receiving port 2011 and the second signal receiving port 2012. The first SPMT switch 501 further selectively connects one of the fifth signal receiving port 2011, the sixth signal receiving port 2012 and the seventh signal receiving port 2013 with the first antenna 101.

The to-be-transmitted RF signal further comprises a GSM HB signal and a GSM LB signal. The signal transmitting port further comprises a fourth signal transmitting port 2019 and a fifth signal transmitting port 2020. The second SPMT switch 502 further selectively connects one of the fourth signal transmitting port 2019 and the fifth signal transmitting port 2020 with the second antenna 103.

Additionally, the mobile communication terminal further comprises a broadband power coupler 601 disposed between the first antenna 101 and the second SPMT switch 502 to detect a transmitting power of the to-be-transmitted RF signal.

Power parameters of the respective modules described above are as follows:

The wireless transceiver 102:
1) maximum output power: 4 dBm
2) minimum output power: −78 dBm
3) receiving frequency band noise: −160 dBm/Hz The power amplifiers 301, 302, 303, 304 and 305 (301, 302 and 303):
1) amplifier gain within HB transmitting band: 24 dB
2) amplifier gain within LB transmitting band: 23 dB
3) amplifier gain within high-frequency receiving band: −1 dB
4) amplifier gain within low-frequency receiving band: −2 dB
5) gain attenuation from transmitting frequency band to receiving frequency band: 25 dB
6) high-frequency total output receiving band noise: −161 dBm/Hz
7) low-frequency total output receiving band noise: −162 dBm/Hz The LPFs (401, 402 and 403):
1) insertion loss: high frequency 0.8 dB, low frequency 0.5 dB
2) harmonic suppression: 25 dB
3) output receiving band noise: high frequency −161.8 dBm/Hz, low frequency −162.5 dBm/Hz The second SPMT switch 502:
1) insertion loss: high frequency 0.8 dB, low frequency 0.5 dB
2) output receiving band noise: high frequency −162.6 dBm/Hz, low frequency −163 dBm/Hz The broadband power coupler 601:
1) insertion loss: 0.3 dB The RF transmitting line (not shown):
1) insertion loss: high frequency 0.6 dB, low frequency 0.2 dB
2) output receiving band noise: high frequency −163.5 dBm/Hz, low frequency −163.5 dBm/Hz After the transmitting antenna and the receiving antenna are isolated from each other, the transmitting path falls on the first antenna 101 at the noise level of −173.5 dBm/Hz at the receiving antenna. This satisfies the reception performance requirement for the entire system.

The LPFs 401, 402, 403, 404 and 405, the second SPMT switch 502 and the broadband power coupler 601 are integrated into one chip. This can save the space and reduce the length of the RF transmission line to make the path between the output end of the power amplifier and the second antenna 103 as short as possible, thereby further reducing the insertion loss.

It should also be appreciated that, the above analysis represents a solution for 3 frequency bands of the WCDMA. Additional paths for 4G or other frequency bands supported by 3G and FDD can be added by simply increasing or decreasing the number of ports of the first SPMT switch 501 and the second SPMT switch 502. All the transmitting paths have almost the same configurations.

In conventional amplifier technologies, amplifiers made by the CMOS (Complementary Metal Oxide Semiconductor) process can have small-sized precision inductors and capacitors integrated therein. Therefore, the specification requirements for the amplifiers can be easily satisfied.

The present disclosure proposes a novel RF architecture for an FDD mobile communication terminal which eliminates the use of a duplexer. Therefore, the following advantages can be achieved:

1) reducing the insertion loss, thereby decreasing the power consumption;
2) reducing the maximum power that the power amplifiers 301, 302, 303, 304 and 305 need to output, thereby decreasing the heat dissipation load of the terminal; and
3) eliminating the need of a duplexer which uses the acoustic surface wave filter process, and allowing the front-end modules (such as the power amplifiers 301, 302, 303, 304 and 305, and the like) to be integrated together. In conventional designs in which the duplexer architecture is introduced, the non-convergence of impedance in the transmitting path caused by the non-linearity of the duplexer makes it very difficult to achieve a high smooth degree within the transmitting band.

The present disclosure proposes a solution in which dual antennas are used. That is, the transmitting path and the receiving path are separated and respectively communicate via one antenna. Since the separated antennas provide an isolation degree of about 10 dB, the required Rx Band Noise level of the transmitting path can be lowered.

The framework diagram of the RF architecture for this solution is shown in FIG. 2. It should be noted that, this solution is especially suitable for a platform in which the wireless transceiver 102 has a relatively low output power.

Therefore, the technical solution of the present disclosure eliminates the need of a duplexer by providing the first antenna 101 for receiving an RF signal from the outside and the second antenna 103 for transmitting a to-be-transmitted RF signal. Therefore, the problem of insertion loss caused by using the duplexer is solved, thereby lowering the noise level in the transmitting path within the receiving frequency band. Additionally, the power consumption and heat generation of the system can be lowered and, meanwhile, the RF architecture can be simplified to lower the cost and achieve a more compact space. The present disclosure is especially suited for platforms with relatively low output power.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A mobile communication terminal, comprising:
   a first antenna, being configured to receive a radio frequency (RF) signal from the outside;
   a wireless transceiver comprising a signal receiving port and a signal transmitting port, being configured to obtain the RF signal from the first antenna via the signal receiving port and amplifies a down-converted signal in the RF signal into a baseband signal;
   a baseband processor, being configured to obtain the baseband signal from the wireless transceiver and demodulate the baseband signal to generate a to-be-transmitted signal for transmission to the wireless transceiver;
   the wireless transceiver is further configured to convert the to-be-transmitted signal into an RF signal and output the RF signal from the signal transmitting port; and
   a second antenna, being configured to obtain the to-be-transmitted RF signal from the signal transmitting port and transmit the to-be-transmitted RF signal;
   wherein the RF signal comprises a Wideband Code Division Multiple Access BC1 (WCDMA BC1) signal, a WCDMA BC2 signal, a WCDMA BC5 signal and a WCDMA BC8 signal, the signal receiving port comprises a first signal receiving port, a second signal receiving port, a third signal receiving port and a fourth signal receiving port, and the mobile communication terminal further comprises a first single-pole multi-throw (SPMT) switch disposed between the first antenna and the wireless transceiver to selectively connect one of the first signal receiving port, the second signal receiving port, the third signal receiving port and the fourth signal receiving port with the first antenna.

2. The mobile communication terminal of claim 1, further comprising:
   a power amplifier disposed between the wireless transceiver and the second antenna, the power amplifier having an input end connected to the signal transmitting port and an output end connected to the second antenna, and being configured to amplify the power of the to-be-transmitted RF signal output from the signal transmitting port, and output the to-be-transmitted RF signal of which the power has been amplified to the second antenna.

3. The mobile communication terminal of claim 2, further comprising:
   a low-pass filter (LPF) disposed between the power amplifier and the second antenna, being configured to perform low-pass filtering on the to-be-transmitted RF signal output from the output end of the power amplifier.

4. The mobile communication terminal of claim 1, further comprising:
   a receiving acoustic surface wave filter disposed between the first antenna and the wireless transceiver, being configured to perform receiving acoustic surface wave filtering on the RF signal received by the first antenna and output the RF signal, on which the receiving acoustic surface wave filtering has been performed, to the signal receiving port.

5. The mobile communication terminal of claim 1, wherein the to-be-transmitted RF signal comprises a to-be-transmitted WCDMA BC1 signal, a to-be-transmitted WCDMA BC2 signal or a to-be-transmitted WCDMA BC5 signal, the signal transmitting port comprises a first signal transmitting port, a second signal transmitting port and a third signal transmitting port, and the mobile communication terminal further comprises a second SPMT switch disposed between the second antenna and the wireless transceiver to selectively connect one of the first signal transmitting port, the second signal transmitting port and the third signal transmitting port with the second antenna.

6. The mobile communication terminal of claim 5, wherein the RF signal further comprises a Global System for Mobile (GSM) 900 signal, a GSM 850 signal and a GSM DCS (Digital Cellular Service) signal, the signal receiving port comprises a fifth signal receiving port, a sixth signal receiving port and a seventh signal receiving port, the first SPMT switch further selectively connects one of the fifth signal receiving port, the sixth signal receiving port and the seventh signal receiving port with the first antenna.

7. The mobile communication terminal of claim 6, wherein the to-be-transmitted RF signal further comprises a GSM HB (High Band) signal and a GSM LB (Low Band) signal, the signal transmitting port further comprises a fourth signal transmitting port and a fifth signal transmitting port, and the second SPMT switch further selectively connects one of the fourth signal transmitting port and the fifth signal transmitting port with the second antenna.

8. The mobile communication terminal of claim 7, further comprising a broadband power coupler disposed between the first antenna and the second SPMT switch to detect a transmitting power of the to-be-transmitted RF signal.

9. The mobile communication terminal of claim 7, wherein the low-pass filter, the second SPMT switch and the broadband power coupler are integrated into one chip.

* * * * *